Patented June 19, 1951

2,557,657

UNITED STATES PATENT OFFICE 2,557,657

WATER BASE DRILLING FLUID

Rudolf August Henkes, Maracaibo, Venezuela, assignor to Shell Development Company, San Francisco, Calif., a corporation of Delaware No Drawing. Application October 13, 1948, Serial No. 54,359. In the Netherlands October 16, 1947

7 Claims. (Cl. 252—8.5)

This invention relates to the drilling of oil and gas wells and pertains more particularly to the use and composition of an improved drilling fluid.

Drilling fluids or muds are usually pumped down through the drill stem of the rotary rig and around the drill bit, returning to the surface through the annular passage between the drill stem and the well casing. Drilling fluids fulfill the various functions of carrying cuttings to the surface of the well, cooling and lubricating the drilling tools, sealing the walls of the borehole, preventing the settling of the cuttings around the drill bit, and supplying a static head to overcome pressures encountered during the drilling operations that tend to blow the fluid from the borehole.

A prime requisite of a satisfactory drilling emulsion or fluid is that it possess good plastering or sheath-forming characteristics, that is, it must form on the walls of the borehole a mudsheath effectively preventing any appreciable fluid loss to the formation. Any substantial loss of fluid to the formation is undsirable at any time during the drilling, being especially dangerous and objectionable when drilling through heaving formations such as shale, or when drilling onto the producing zone, which may be contaminated and plugged by said fluid.

The plastering process that takes place is due to the drilling fluid in the borehole being subjected to a higher pressure than that prevailing in the drilled-in-formations, on account of which the drilling fluid tends to penetrate the strata. Normally the drilling fluid proper does not penetrate the layer, but the clay particles of the fluid are filtered off and deposited on the wall of the well. These particles constitute the so-called plaster layer or plaster cake; only the flush water filters through this cake and penetrates the formation.

When the oil-producing zone of the well borehole is a sandy formation, which may or may not contain clay, it is often necessary for the production of the oil to install at the bottom of the well casing a screen pipe with relatively small openings, which is fitted in the borehole on a level with the producing layer in order to prevent the borehole from caving in and sand being entrained. On bringing the layer into production, the aforementioned plaster cake becomes detached from the wall of the borehole and tends to clog the openings of the screen, which adversely affects the oil production of the well. In order to prevent or remedy this, a washing process is often applied, which comprises forcing an aqueous washing liquid between the screen and the wall of the hole over a long period (for instance 10 hours), so that the cake is washed off. The washing process has the disadvantage, however, that during this period water is forced into the formation, which greatly reduces the oil-producing capacity of the layer. On the one hand the pores of the formation are clogged by water, while on the other any clay in the formation begins to swell and the pores of the formation are contracted.

It is therefore an object of the present invention to provide an improved drilling fluid adapted to form a thin impervious mud-sheath or filter cake on the walls of the borehole which readily disintegrates into very fine particles when washed therefrom, said particles being of a size permitting them to be washed through a well screen.

It is also an object of the present invention to provide a drilling fluid for use in drilling wells wherein the producing formation comprises an argillaceous material which may swell when contacted with fresh water.

A further object of this invention is to provide a drilling fluid possessing good temperature stability thus enabling its use in high temperature wells.

These and other objects of this invention will be understood from the following detailed description of the invention.

There are several types of drilling fluids used in well drilling operations. The mud or fluid of the present invention is concerned only with the type known as water-base muds. The drilling fluid of the present invention comprises an aqueous salt solution, a small amount of a hydrophilic colloid and a small amount of lampblack. Preferably the drilling fluid also contains a small quantity of a lampblack dispersing substance such as a tanning substance, such as for example, divi-divi. It was found that the addition of a small quantity of an aqueous dividivi solution resulted in better dispersion of the lampblack.

The suspending medium of the mud comprises an aqueous salt solution, preferably a concentrated or substantially saturated solution that does not have any deleterious effect on clayey sands. In view of the fact that most clays and shales associated with oil-bearing formations appear to be sodium clays, it is preferred that solutions of water soluble salts of polyvalent metals, especially divalent metals, be used. When the drilling fluid according to the present invention contains a water soluble salt other than sodium, for example, a calcium salt, it has the additional advantage of improving the permeability of any clayey sands drilled through by the contact of the calcium ions in the fluid with the sands. The increase in permeability of the clayey sands must be ascribed to the interchange of sodium ions of the relatively impermeable sodium clay-bearing sand with the calcium ions of the drilling fluid to form a more permeable formation. The water soluble salts of calcium, magnesium and barium may be used to form especially good drilling fluids. The more soluble salts are preferred in order to obtain a substantially saturated solution that is relatively heavy, thus reducing the amount of weighting materials to be added to obtain a drilling fluid of the desired weight.

Hydrophilic colloids suitable for use in the drilling fluid of the present invention are, inter alia: amylum products, such as starch; cellulose products and derivatives, for example, water dispersible cellulose ethers such as methylcellulose and carboxymethylcellulose; water dispersible natural gums of the glycoside type, such as gum arabic and tragacanth; and alginates. The hydrophilic colloids may be used in quantities from less than one-half per cent to about five per cent of the weight of the drilling fluid, depending upon the colloid used and the composition of the drilling fluids. If starch is used, an excellent drilling fluid is obtained having in the range of from about one-half to about two and one-half per cent of starch admixed therein. A preferred amylum product is starch, usually in the soluble form which may be obtained by pretreating the starch with lye or by subjecting it to a temperature treatment. The starch may be from any suitable source such as sago, tapioca, soya-bean, corn, potato, etc., and may be modified or unmodified, such as the thin boiling types. When using starch in a drilling fluid it has normally been necessary to add a preservative or fermentation inhibitor such as creosote, benzene, benzoic acid, mercuric iodide, soluble metal chromates, arsenates and arsenites, etc., usually in the amounts of from less than 1 per cent to 15 per cent or more based on the weight of the starch. However, in general it is not necessary to add a preservative to drilling fluids according to the present invention as the lampblack appears to have a preserving action on amylum products contained in the drilling fluid so that the latter is not readily deteriorated as it is in the absence of the lampblack. An additional preservative may be added if desired, however.

It may be seen in Table I that the amount of lampblack used depends upon whether or not a lampblack dispersing substance, such as divi-divi, is also added to the drilling fluid. If a lampblack dispersing substance is not included it may be seen that a drilling mud having satisfactory filter loss properties may be made containing at least about 0.5 per cent of lampblack. However, if at least about 0.5 per cent of divi-divi is included, muds having satisfactory filter loss properties may be made containing from about 0.25 to about one per cent or more of lampblack.

The drilling fluid of this invention is capable of forming a plaster cake on the walls of the borehole which readily disintegrates into extremely fine particles when washed from said walls, the particles being of a size small enough to pass through a well screen, thus preventing it from becoming clogged. Weighting materials, which are well known to the art, may be added to the present drilling fluid but preferably only small quantities of clay or other finely divided weighting materials need be added and they may generally be omitted altogether. Even when the drilling fluid contains a minimum of solid material it has excellent plastering properties and possesses good temperature stability.

While a plaster cake or mud sheath is normally washed off the walls of a borehole in the oil producing formation, the plaster cake obtainable with the present drilling fluid becomes readily detachable in the producing formation, by the flow of oil into the well borehole. It is possible to make use of this excellent property of the plaster cake when drilling in other than clayey oil sands. While the present drilling fluid is especially adapted to be used when drilling in the oil-bearing sands it is not intended to limit its use for this purpose. It may be also used with good results in normal drilling operations.

In spite of the small quantity of solid material present, the drilling fluid—owing to the application of a salt solution, preferably a saturated solution of a calcium compound—is heavy enough to resist the pressure of the formation. However, the fluid is particularly suitable when drilling in layers with a relatively low formation pressure.

While it is already known to use saturated or substantially saturated salt solutions per se as drilling fluids, and it is also known to add hydrophilic colloids such as starch to clay-containing drilling fluids, it is only by incorporating lampblack and a hydrophilic colloid in a substantially aqueous salt solution that a drilling fluid with the above-mentioned excellent properties may be obtained.

EXAMPLE

A drilling fluid according to the invention was prepared by first mixing the lampblack with a quantity of a 10% divi-divi solution to form a smooth paste and then adding a quantity of dry starch, after which the mixture was stirred until it had become a homogeneous mass. To this mixture a 37% calcium chloride solution was added at 65° C., mixing being effected in a mechanical stirring device for three minutes, after which the resultant drilling fluid was cooled down to room temperature.

The filter losses of this drilling fluid were measured in cub. cm. during 30 minutes at a pressure of 7 kg./sq. cm. (99.5 lbs per sq. in.). The following results were obtained with a calcium chloride solution containing 2½% starch and an admixture of various quantities of divi-divi solution and lampblack.

*Table I*

| Divi-divi solution in per cent | Lampblack in per cent | Filter losses |
|---|---|---|
| 0 | ¼ | 79.0 |
| 0 | ½ | 3.8 |
| 0 | 1 | 4.8 |
| ½ | ¼ | 4.8 |
| ½ | ½ | 4.2 |
| ½ | 1 | 3.9 |
| 1 | ¼ | 10.8 |
| 1 | ½ | 3.7 |
| 1 | 1 | 3.2 |
| 2 | ¼ | 5.0 |
| 2 | ½ | 4.2 |
| 2 | 1 | 2.4 |

In Table II the results are listed that have been obtained with a drilling fluid containing a calcium chloride solution with an admixture of 1% divi-divi solution, ½% lampblack and various quantities of starch.

*Table II*

| Starch in per cent | ½ | 1 | 1½ | 2 | 2¼ |
|---|---|---|---|---|---|
| Days | Filter Loss in c. c./30 min. | | | | |
| 0 | 5.1 | 2.0 | 3.3 | 3.3 | 3.4 |
| 1 | 3.5 | 2.7 | 3.2 | 3.1 | 4.1 |
| 3 | 5.3 | 3.3 | 2.8 | 2.7 | 2.6 |
| 4 | 3.3 | 2.3 | 3.0 | 2.1 | 2.0 |
| 6 | 2.4 | 2.7 | 3.5 | 2.9 | 2.1 |

The filter losses of the drilling fluid were measured at various times after the preparation thereof, viz., after the number of days mentioned in the first column.

I claim as my invention:

1. A water-base drilling fluid for wells comprising an aqueous solution of a water-soluble salt of a polyvalent metal, having added thereto from about 0.5 to about 5.0 per cent by weight of an organic hydrophilic colloid which is not coagulated by polyvalent metal salts and from about 0.5 to about 1.0 per cent by weight of lampblack.

2. A water-base drilling fluid for wells comprising a substantially concentrated aqueous solution of a water-soluble salt of a divalent metal having added thereto from about 0.5 to about 2.5 per cent by weight of an amylum product and from about 0.5 to about 1.0 per cent by weight of lampblack.

3. A water-base drilling fluid for wells comprising a substantially concentrated aqueous solution of a water-soluble salt of a divalent metal having added thereto from about 0.5 to about 2.5 per cent by weight of an amylum product, from about 0.25 to about 1.0 per cent by weight of lampblack and from about 0.5 to about 2.0 per cent by weight of divi-divi.

4. A water-base drilling fluid for wells comprising a substantially saturated solution of calcium chloride having added thereto from about 0.5 to about 2.5 per cent by weight of starch, from about 0.25 to about 1.0 per cent by weight of lampblack and from about 0.5 to about 2.0 per cent by weight of divi-divi.

5. A water-base drilling fluid for wells comprising an aqueous solution of a water-soluble alkaline earth metal salt having added thereto from about 0.5 to about 5.0 per cent by weight of an organic hydrophilic colloid, which is not coagulated by polyvalent metal salts and about 0.25 to about 1.0 percent by weight of lampblack.

6. A water-base drilling fluid for wells comprising an aqueous solution of a water-soluble alkaline earth metal salt, said salt being selected from the group consisting of calcium, barium and magnesium water-soluble salts, said solution having added thereto from about 0.5 to about 5.0 per cent by weight of an organic hydrophilic colloid which is not coagulated by polyvalent metal salts and about 0.25 to about 1.0 per cent by weight of lampblack.

7. A water-base drilling fluid for wells comprising a substantially concentrated aqueous solution of a water-soluble salt of a divalent metal having added thereto from about 0.5 to about 2.5 per cent by weight of starch and from about 0.5 to about 1.0 per cent by weight of lampblack.

RUDOLF AUGUST HENKES.

REFERENCES CITED

The following references are of record in the file of this patent:

UNITED STATES PATENTS

| Number | Name | Date |
|---|---|---|
| 1,999,766 | Lawton et al. | Apr. 30, 1935 |
| 2,222,949 | Henkes | Nov. 26, 1940 |
| 2,241,255 | Garrison | May 6, 1941 |
| 2,297,660 | Mazee | Sept. 29, 1942 |
| 2,337,296 | Kennedy et al. | Dec. 21, 1943 |
| 2,371,955 | Dawson | Mar. 20, 1945 |
| 2,399,986 | Chapman | May 7, 1946 |
| 2,425,768 | Wagner | Aug. 19, 1947 |

OTHER REFERENCES

Bennett, Chemical Formulary, vol. V, page 73, pub. 1941 by Chem. Pub. Co. of Brooklyn, N. Y. (Copy in Div. 64.)